US012545875B2

(12) United States Patent
Metzger et al.

(10) Patent No.: US 12,545,875 B2
(45) Date of Patent: Feb. 10, 2026

(54) SYSTEM FOR HANDLING SENSITIVE PRODUCTS, IN PARTICULAR PACKAGING SYSTEM

(71) Applicant: Syntegon Technology GmbH, Waiblingen (DE)

(72) Inventors: Simon Metzger, Roggenburg (DE); David Martin, Coxhoe (GB); Heiko Haag, Dinkelsbühl (DE); Sebastian Graf, Satteldorf (DE); Nigel Wood, Barnard Castle (GB)

(73) Assignee: Syntegon Technology GmbH, Waiblingen (DE)

( * ) Notice: Subject to any disclaimer, the term of this patent is extended or adjusted under 35 U.S.C. 154(b) by 880 days.

(21) Appl. No.: 17/612,108

(22) PCT Filed: Mar. 12, 2020

(86) PCT No.: PCT/EP2020/056720
§ 371 (c)(1),
(2) Date: Nov. 17, 2021

(87) PCT Pub. No.: WO2020/233854
PCT Pub. Date: Nov. 26, 2020

(65) Prior Publication Data
US 2022/0251488 A1    Aug. 11, 2022

(30) Foreign Application Priority Data

May 18, 2019  (DE) .................. 10 2019 207 280.1

(51) Int. Cl.
*B65B 5/10*        (2006.01)
*B25J 15/10*       (2006.01)
(Continued)

(52) U.S. Cl.
CPC ............. *C12M 23/10* (2013.01); *B65B 5/105* (2013.01); *C12M 23/38* (2013.01); *C12M 23/50* (2013.01)

(58) Field of Classification Search
None
See application file for complete search history.

(56) References Cited

U.S. PATENT DOCUMENTS

| 2002/0090320 A1* | 7/2002 | Burow ..................... B01L 9/523 422/561 |
| 2003/0034086 A1* | 2/2003 | Stewart .................. B65B 3/003 141/97 |

(Continued)

FOREIGN PATENT DOCUMENTS

| DE | 19947786 A1 | 4/2001 |
| EP | 1460126 A2  | 9/2004 |

(Continued)

OTHER PUBLICATIONS

International Preliminary Report on Patentability for Application No. PCT/EP2020/056720 dated Nov. 18, 2021 (6 pages).
Translation of International Search Report for Application No. PCT/EP2020/056720 dated Jun. 16, 2020 (3 pages).

(Continued)

*Primary Examiner* — Neil N Turk
(74) *Attorney, Agent, or Firm* — Michael Best & Friedrich LLP

(57) ABSTRACT

The present invention relates to a system for handling sensitive products, in particular for filling and sealing medicaments in containers, comprising an enclosed space (2) in which the sensitive products are handled, a device (3) for monitoring the air in the enclosed space (2) with a measuring point (6) and at least one Petri dish (30), wherein the Petri dish (30) comprises a lower receptacle (31) and a removable lid (32), and an automatic handling device (4), wherein the automatic handling device (4) is designed to automatically transport the Petri dish to the measuring point (6) and back (Continued)

and to remove the lid (32) from the lower receptacle (31) of the Petri dish (30) and put it back on.

10 Claims, 3 Drawing Sheets

(51) Int. Cl.
  *C12M 1/00* (2006.01)
  *C12M 1/22* (2006.01)

(56) References Cited

U.S. PATENT DOCUMENTS

| | | | |
|---|---|---|---|
| 2007/0086878 A1* | 4/2007 | Stanley | B25J 15/10 |
| | | | 414/225.01 |
| 2011/0202171 A1* | 8/2011 | Rosenbaum | B65B 35/18 |
| | | | 707/758 |
| 2011/0259452 A1* | 10/2011 | Carter | G01N 1/2208 |
| | | | 137/565.13 |
| 2019/0017008 A1* | 1/2019 | Pahara | C12M 23/06 |

FOREIGN PATENT DOCUMENTS

| | | |
|---|---|---|
| JP | 2004286568 A | 10/2004 |
| WO | 2017072591 A1 | 5/2017 |
| WO | 2018050889 A2 | 3/2018 |

OTHER PUBLICATIONS

Japanese Patent Office Action for Related Application No. 2021568810 dated Jan. 24, 2023 (8 pages, including an English translation).

* cited by examiner

SYSTEM FOR HANDLING SENSITIVE PRODUCTS, IN PARTICULAR PACKAGING SYSTEM

BACKGROUND

The present invention relates to a system for handling sensitive products, in particular liquid or powdered pharmaceuticals or the like, and in particular to a packaging system for filling and sealing containers for pharmaceuticals.

When handling pharmaceutical products, increased purity requirements must be met when filling and sealing containers filled with such pharmaceutical products. Such a packaging system is known from DE 199 47 786 A1, for example. The packaging system comprises a cleanroom designed as an isolator with the strictest requirements. It is also known that the air in such cleanrooms is monitored in order to avoid microbiological contamination of the product to be filled. For this purpose, Petri dishes with a corresponding culture medium are arranged in the cleanroom. Such Petri dishes are handled manually by means of a glove port in the isolator. If necessary, the Petri dish is also manually labeled in order to be able to assign the Petri dish to a filled batch of the product. However, manual intervention in the packaging system increases the risk of an error occurring during the manual handling. Also, Petri dish handling cannot be carried out reproducibly due to the human factor. Human errors that occur are, for example, opening the Petri dish too early or too late or incorrectly positioning the Petri dish within the cleanroom. Other sources of error are incorrect or incomplete labeling. It would therefore be desirable to have an improved packaging system.

EP 1 460 126 A2 and WO 2018/050 889 A2 each disclose a system.

SUMMARY

The system according to the invention for handling sensitive products has the advantage that safe and simple handling is possible through automation. In this way, human errors in the microbiological air monitoring within the system can be avoided. Manual interventions by a person from outside the system are no longer necessary. If pharmaceuticals are filled, for example, this results in a significant reduction in a pharmaceutical risk for the overall process within the system. It is also possible to rule out possible injuries to a user which could occur when using a glove port to reach into the interior of the system. This is achieved according to the invention by the fact that the system comprises an enclosed space in which the sensitive products are handled and a device for monitoring the air in the enclosed space. The device for monitoring the air comprises a measuring point and at least one Petri dish. The Petri dish is arranged inside the enclosed space and comprises a lower receptacle (dish) and a lid. The system further comprises an automatic handling device, wherein the handling device is designed to automatically remove the lid from the lower receptacle of the Petri dish and put it on. A culture medium or the like is provided in the Petri dish to allow microbiological air monitoring in the enclosed space. For this purpose, the closed Petri dish is automatically sealed-and-brought to the measuring point by means of the automatic handling device, and the lid is removed from the Petri dish and stored at a predetermined storage location. After a predetermined time has elapsed, the lid is then picked up again, placed on the lower receptacle of the Petri dish, and this is brought to a storage location in a magazine, for example. If necessary, a new Petri dish is automatically removed and positioned on the measuring point, the lid of the new Petri dish is removed and a second measurement is carried out. Thus, according to the invention, the microbiological air monitoring can be carried out fully automatically inside the system, without a user having to carry out Petri dish handling from the outside by using a glove port or the like.

According to the invention, the automatic handling device is designed to carry out further handling steps, in particular transport steps for containers. This makes it possible for the automatic handling device to take on additional tasks besides air monitoring. For example, containers into which a product is to be filled can be transported inside the enclosed space between a filling station and a sealing station for the container. Alternatively or additionally, the automatic handling device can also transport empty and/or filled containers from a storage location or to a storage location.

The system preferably comprises a large number of Petri dishes. The large number of Petri dishes are preferably provided in an air sampler having a collecting head and a magazine for the Petri dishes. The automatic handling device can preferably also automatically remove the collecting head of the air sampler and put it on. This allows the degree of automation to be increased further.

The system particularly preferably further comprises a filling station for filling the sensitive products into containers and a sealing station for sealing the filled containers. The automatic handling device is particularly preferably designed to transport the containers from the filling station to the sealing station. The containers can be transported individually, or alternatively multiple containers can be transported at the same time. In this case, an additional format device can be provided in order to accommodate multiple containers at the same time.

The automatic handling device is particularly preferably a robot. The robot is preferably a 6-axis robot. The robot further preferably has a gripper with at least two gripping jaws. Containers or the Petri dishes can be clamped between the two gripping jaws. More preferably, the robot can change the gripper so that different gripping jaws can be attached to the robot. This may be necessary, for example, when the automatic handling device is used both for monitoring the air by means of the Petri dishes and for transporting containers.

According to a further preferred embodiment of the present invention, the system further comprises an identification device. The identification device is designed to identify Petri dishes and to assign a measuring time during which the Petri dish was open, in order to carry out microbiological air monitoring, to this Petri dish.

Preferably, each Petri dish has an individual, optical identification mark. This can be a barcode or an identification number or the like, for example. The identification device also has an optical recognition device. For example, this can be a scanner or a camera or the like.

The enclosed space of the system is particularly preferably designed in such a way that the system has an isolator system or restricted-access barrier system (RABS). Thus, the system according to the invention is a cleanroom system with increased requirements for air quality. This is necessary for example when handling pharmaceuticals or fine chemicals or the like.

BRIEF DESCRIPTION OF THE DRAWINGS

A system for handling sensitive products according to a preferred embodiment of the invention is described in detail below. In the drawings.

DETAILED DESCRIPTION

A filling and packaging system according to a first preferred embodiment of the invention is described in detail below with reference to FIG. 1 to 4.

Figure 1:
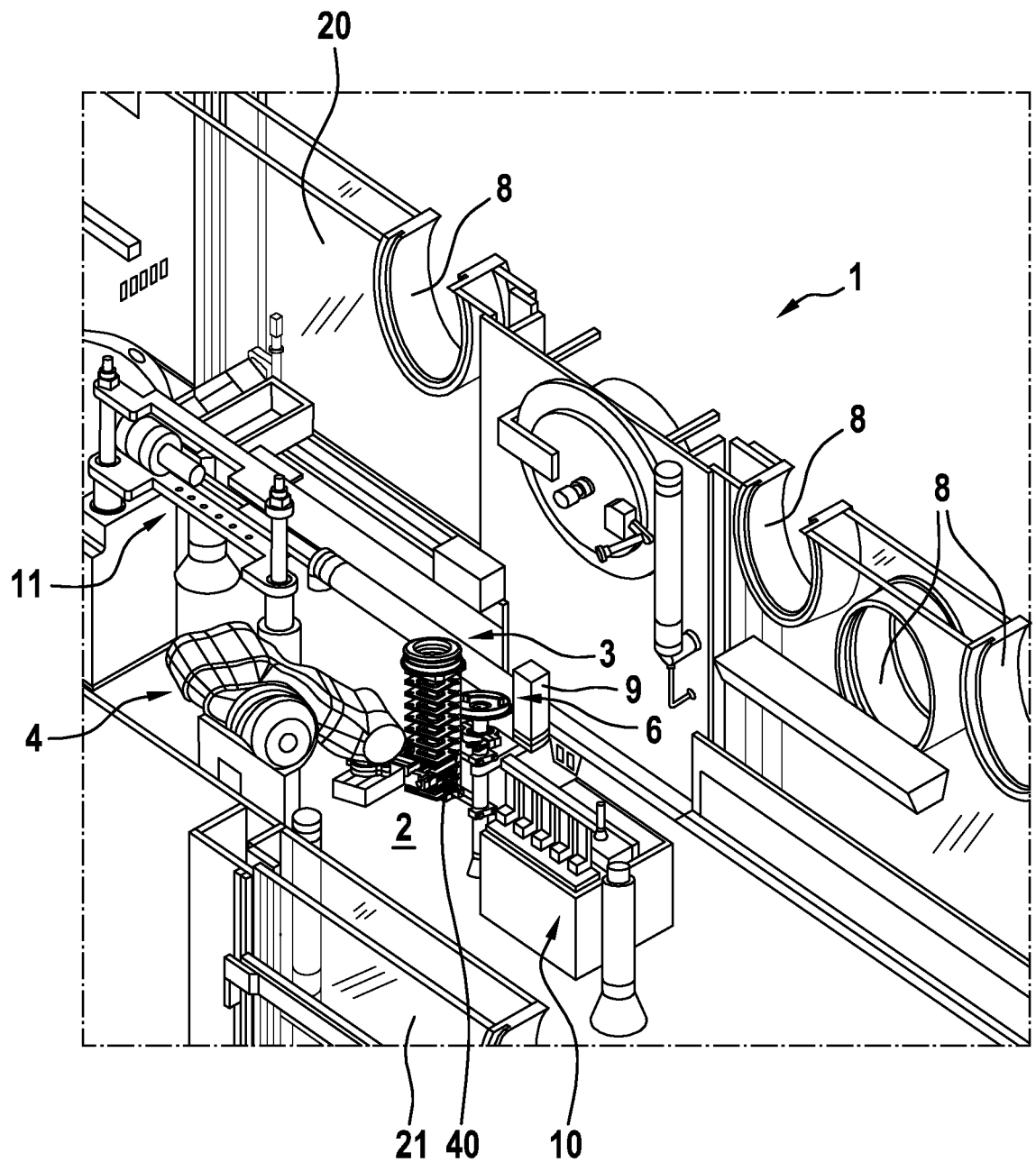
FIG. 1 is a schematic, perspective view of a system according to a preferred embodiment of the invention and FIG. 2 to 4 schematically show the automated handling within the system for microbiological air monitoring.

As can be seen from the schematic view of FIG. 1, the system 1 comprises an enclosed space 2 which is closed off from the surroundings by space walls 20, 21. A plurality of hand ports 8 are provided in the space wall 20 in order to allow gloves (not shown) to be used in the enclosed space 2.

The system 1 is a filling and sealing system for pharmaceutical products and comprises a filling station 10 and a sealing station 11. These are shown only schematically in FIG. 1.

Furthermore, a device 3 for air monitoring is provided for microbiological air monitoring in the enclosed space 2. The device 3 can be seen in detail from FIG. 2 to 4.

The device 3 for air monitoring comprises a magazine 33 having a large number of Petri dishes 30. In this embodiment, exactly three Petri dishes 30 are provided.

Each Petri dish 30 comprises a lower receptacle 31 (dish) and a lid 32. A culture medium or the like is introduced into the lower receptacle 31. During the filling and sealing of the pharmaceutical products, the Petri dish is opened so that any germs located in the enclosed space 2 settle in the Petri dish. After the containers have been filled and sealed, this Petri dish can then be removed from the system 1 and sent for further examination. Only after it has been established that there are no germs in the Petri dish opened during filling is the correspondingly filled batch of pharmaceuticals released.

Figure 2:
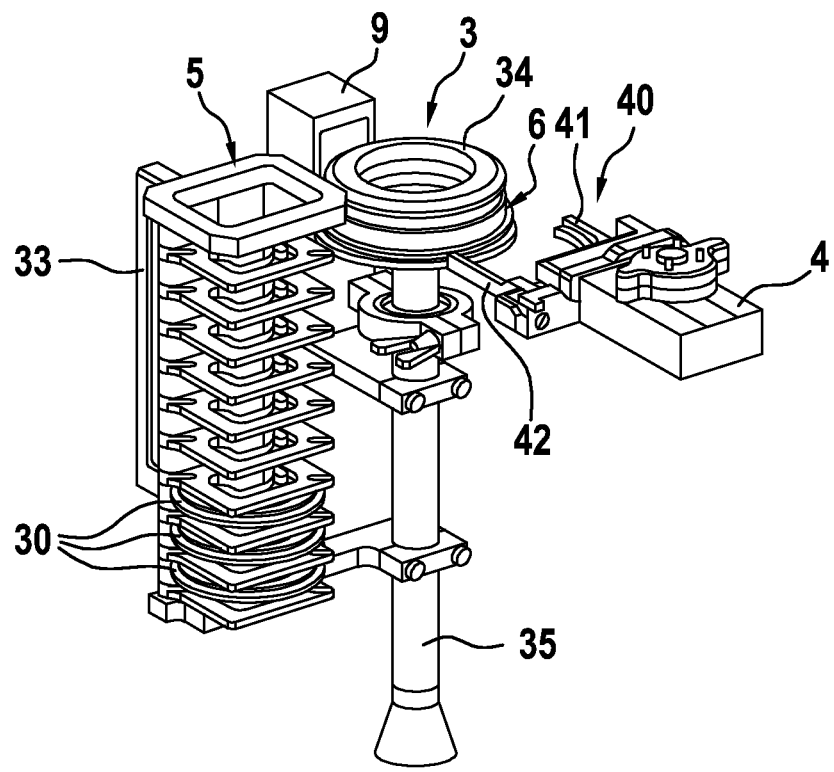
Figure 3:
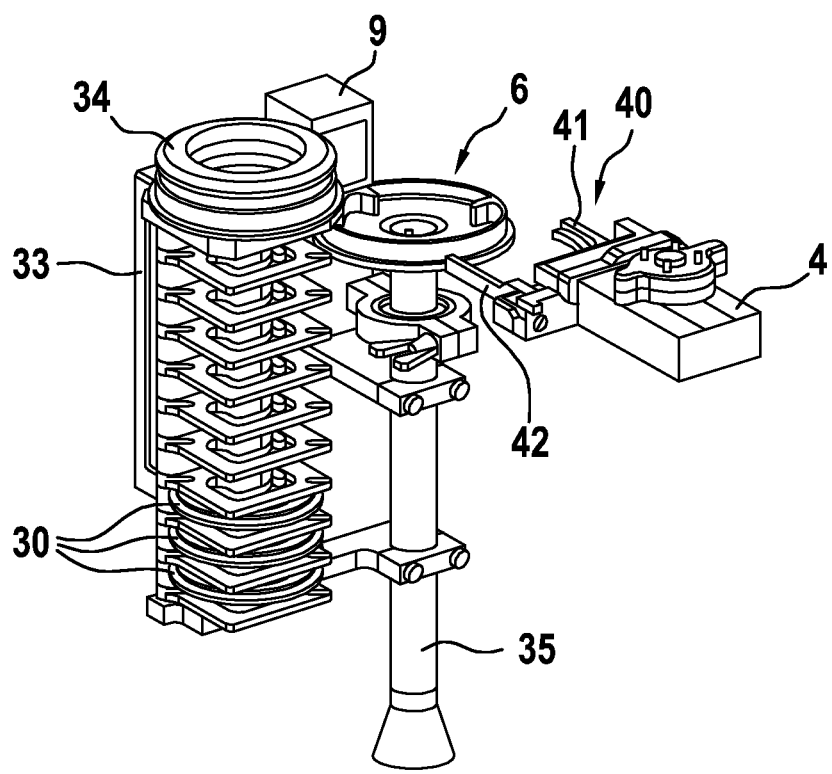
Figure 4:
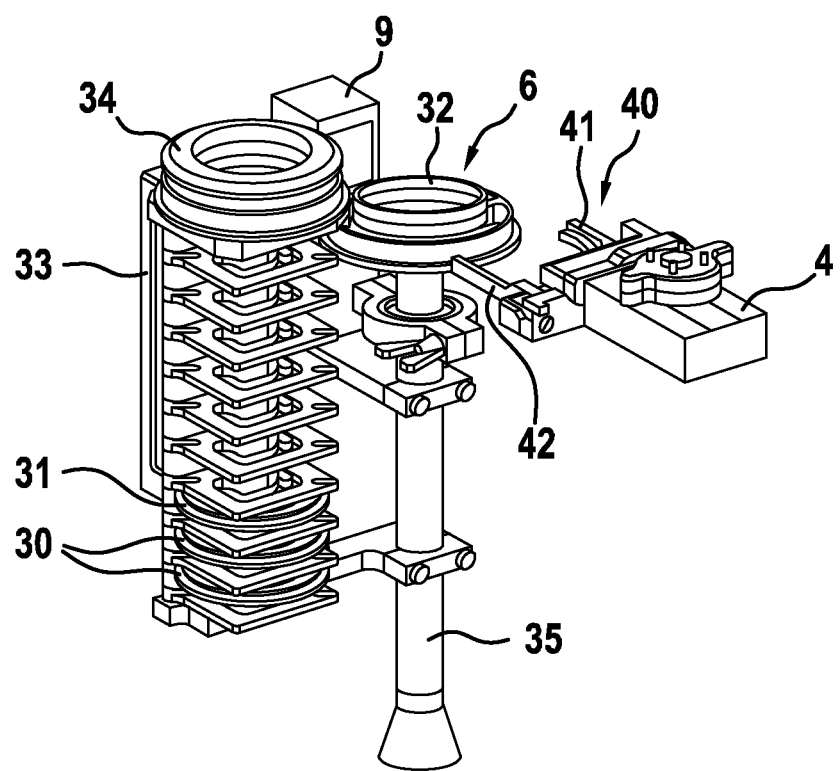

As can be seen from FIG. 2 to 4, the device 3 for air monitoring comprises a vertical magazine 33 for this purpose, in which Petri dishes 30 can be stored one above the other. Next to the magazine 33 there is a so-called collecting head 34 of an air sampler, in which an opened Petri dish is placed in order to carry out the air monitoring. A measuring point 6 is thus provided in the collecting head 34.

In addition to the collecting head 34, the device 3 for air monitoring also comprises an air outlet pipe 35, so that air flows from above into the collecting head 34 onto the opened Petri dish placed therein and is released via the air outlet pipe 35.

The system 1 also comprises an identification device 9, for example a scanner or a camera, which is used to identify the particular Petri dish 30 which is currently being used for air monitoring. For this purpose, the Petri dishes 30 have, for example, barcodes or identification numbers or the like in order to be reliably recognized by means of the identification device 9.

Depending on the length of the filling and sealing process, multiple Petri dishes 30 have to be used for air monitoring.

For this purpose, the system 1 also comprises an automatic handling device 4, which in this embodiment is a 6-axis robot. The automatic handling device 4 automatically carries out the microbiological air monitoring by means of the Petri dishes 30.

In the initial position shown in FIG. 2, exactly three Petri dishes 30 are arranged in the magazine 33 in this embodiment. In a first step, the automatic handling device 4, which comprises a gripper 40 having a first gripping jaw 41 and a second gripping jaw 42, is guided to the collecting head 34 and this is removed from the device 3 for air monitoring and placed at a storage location 5, which is arranged on the magazine 3. This state is shown in FIG. 3.

In a next step, the gripper 40 is guided to one of the Petri dishes 30 in the magazine 33 and one of the Petri dishes 30 is removed from the magazine. The removed Petri dish is placed on a measuring point 6 of the device 3 for air monitoring.

In a next step, the gripper 40 then removes the lid 31 from the Petri dish placed on the measuring point 6 and places the lid 31 in the magazine 33. This state is shown in FIG. 4.

In a next step, the gripper 40 then takes the collecting head 34 from the storage point 5 and positions it over the opened Petri dish 30 on the measuring point 6.

The measuring process can now begin in that the device 3 for air monitoring sucks in air from above through the collecting head 34 and releases it again via the air outlet pipe 35. If germs are present in the enclosed space 2, they are fed to the culture medium in the lower receptacle 31 of the opened Petri dish in the collecting head 34 and can be detected.

After a predetermined period of time, the Petri dish used for monitoring must be replaced with a new Petri dish. For this purpose, the automatic handling device 4 first removes the collecting head 34 again from the device 3 for air monitoring and places it at the storage location 5. The lid 31 stored in the magazine 33 is then removed from the magazine and placed on the lower receptacle 31 of the Petri dish on the measuring point 6. Then the Petri dish 30, which has been closed again in this way, is removed from the measuring point 6 and placed in the magazine 33.

If a further measurement is to be carried out, the automatic handling device 4 then removes the next unused Petri dish 30 from the magazine 33 and positions it again on the measuring point 6. The air monitoring sequence described above is then repeated.

The use of the magazine 33 also has the advantage that a large number of Petri dishes 30 can be brought into and out of the machine in one step, which further simplifies handling.

Thus, microbiological air monitoring can be carried out over an entire batch using multiple Petri dishes, and fully automatic handling is possible.

The automatic handling device 4 of this embodiment is also designed so that the containers are also fed from the filling station 10 to the sealing station 11. This process is carried out by the automatic handling device 4 in those time periods in which it is not necessary to change the Petri dish 30 for air monitoring. Thus, in addition to changing the Petri dishes, the automatic handling device 4 also has additional handling tasks, namely a task of transporting filled containers from the filling station 10 to the sealing station 11. It should be noted that the automatic handling device 4 can also take on other transport tasks, for example feeding empty containers to the filling station or removing sealed, filled containers from the sealing station to a storage position.

Thus, according to the invention, microbiological air monitoring can be achieved with automatic Petri dish handling. This is reproducible and much more reliable compared to the manual handling processes in the prior art, as the risk of human intervention is not present in the invention. In the pharmaceutical sector in particular, this can avoid the risk of unwanted contamination, for example due to particles that can detach from gloves when they are moved through the glove port or due to clumsy Petri dish handling.

In particular, changing the Petri dishes 30 during the filling process cannot be forgotten, since this can be done automatically by a control device.

The identification device 9 can also be used to provide secure and traceable documentation of the samples in the Petri dishes 30.

It should also be noted that the gripper 40 of the robot can also be provided for example in an exchangeable manner, if certain format specifications of the containers would not allow gripping with the gripper for the Petri dishes. For this purpose, an automatic gripper changing device can be provided in the enclosed space 2.

What is claimed is:

1. A system for handling sensitive products, the system comprising:
    an enclosed space (2) configured for handling the sensitive products therein,
    containers for receiving the sensitive products therein, the containers being positioned within the enclosed space (2),
    a device (3) configured to be used for monitoring the air in the enclosed space (2), the device (3) including at least one Petri dish (30) having therein a culture medium, wherein the Petri dish (30) comprises a lower receptacle (31) housing the culture medium and a removable lid (32),
    a filling station (10) positioned within the enclosed space (2) and configured to fill the sensitive products into the containers,
    a sealing station (11) positioned within the enclosed space (2) and configured to seal the filled containers,
    a control device, and
    a single robot controlled by the control device,
    wherein the single robot is configured to:
        automatically transport the Petri dish to and from a measuring point (6) located within the enclosed space (2),
        remove the lid (32) from the lower receptacle (31) of the Petri dish (30),
        thereafter, transport the containers from the filling station (10) to the sealing station (11), and
    thereafter, put the lid (32) back on the lower receptacle (31) of the Petri dish (30).

2. The system according to claim 1, wherein the device (3) for monitoring the air comprises an air sampler having a collecting head (34) and a magazine (33) for receiving a plurality of Petri dishes (30).

3. The system according to claim 2, wherein the single robot is designed to remove the collecting head (34) from the air sampler and put the collecting head on the air sampler.

4. The system according to claim 1, wherein the single robot comprises a gripper (40) having a first and second gripping jaw (41, 42).

5. The system according to claim 1, further comprising an identification device (9) configured to identify Petri dishes (30) and to assign a predetermined measuring time to an identified Petri dish (30).

6. The system according to claim 5, wherein each Petri dish (30) has an individual, optical identification mark and the identification device (9) has an optical recognition device for recognizing the identification mark of the Petri dish.

7. The system according to claim 1, wherein the sensitive products are medicaments, and wherein the system is configured to fill and seal the medicaments in the containers.

8. The system according to claim 1, wherein the single robot is a 6-axis robot.

9. The system according to claim 1, wherein the device (3) is positioned between the filling station (10) and the sealing station (11).

10. The system according to claim 9, wherein the single robot is positioned between the filling station (10) and the sealing station (11).

* * * * *